United States Patent
Fanayar et al.

(10) Patent No.: US 7,815,308 B2
(45) Date of Patent: Oct. 19, 2010

(54) OPHTHALMIC LENSES COMPRISING A PHOTODEGRADATION PROTECTION COATING AND A PROCESS FOR PRODUCING SUCH LENSES

(75) Inventors: Myriam Fanayar, Charenton le Pont (FR); Noemie Lesartre, Charenton le Pont (FR)

(73) Assignee: Essilor International (Compagnie Generale d'Opitique), Charenton-le-Pont (FR)

( * ) Notice: Subject to any disclaimer, the term of this patent is extended or adjusted under 35 U.S.C. 154(b) by 968 days.

(21) Appl. No.: 11/558,080

(22) Filed: Nov. 9, 2006

(65) Prior Publication Data
US 2007/0179224 A1 Aug. 2, 2007

Related U.S. Application Data

(60) Provisional application No. 60/736,473, filed on Nov. 14, 2005.

(30) Foreign Application Priority Data
Nov. 14, 2005 (FR) ................... 05 11513

(51) Int. Cl.
G02C 7/02 (2006.01)
G02C 7/12 (2006.01)
B32B 1/00 (2006.01)
B32B 27/30 (2006.01)
B05D 1/38 (2006.01)
B05D 3/06 (2006.01)

(52) U.S. Cl. .................. 351/163; 351/159; 351/166; 351/177; 427/164; 427/407.1; 428/423.1; 428/500; 428/522

(58) Field of Classification Search .............. None
See application file for complete search history.

(56) References Cited

U.S. PATENT DOCUMENTS

| 4,376,800 | A | | 3/1983 | Lu et al. |
| 5,531,940 | A | | 7/1996 | Gupta et al. |
| 5,619,288 | A | | 4/1997 | White, Jr. et al. |
| 5,648,173 | A | * | 7/1997 | Blizzard ............... 428/446 |
| 6,099,123 | A | | 8/2000 | Engardio et al. |
| 7,022,388 | B2 | * | 4/2006 | Hashimoto et al. ....... 428/34.9 |
| 2001/0014704 | A1 | | 8/2001 | Lai |
| 2001/0025062 | A1 | * | 9/2001 | Szum et al. ............ 522/96 |
| 2002/0115756 | A1 | * | 8/2002 | Lin et al. ............ 524/100 |
| 2003/0027960 | A1 | | 2/2003 | Gilles et al. |
| 2004/0041287 | A1 | | 3/2004 | Engardio et al. |
| 2005/0107537 | A1 | | 5/2005 | Gilles et al. |

FOREIGN PATENT DOCUMENTS

| EP | 0453149 | 10/1991 |
| EP | 1593990 | 11/2005 |
| WO | WO93/21010 | 10/1993 |
| WO | WO98/36006 | 8/1998 |
| WO | WO 03/102057 A1 * | 12/2003 |

* cited by examiner

*Primary Examiner*—Michael J Feely
(74) *Attorney, Agent, or Firm*—Occhiuti Rohlicek & Tsao LLP

(57) ABSTRACT

The present invention relates to an optical article, in particular an ophthalmic lens comprising a substrate, a coating that includes at least one photodegradation-sensitive dye, and a photodegradation protection (anti-UV) coating for protecting the coating containing at least one photodegradation-sensitive dye, the photo-degradation protection coating comprising a blend of acrylate oligomers and monofunctional or multifunctional acrylate monomers, at least one UV absorber and at least one photoinitiator. This anti-UV coating used is particularly suitable for an ophthalmic lens in which the polarizing function is provided by a bilayer system, one layer of which comprises liquid crystals combined with dyes, and more particularly dichroic dyes. Advantageously, the anti-UV coating according to the invention is combined with an oxygen barrier layer.

33 Claims, 2 Drawing Sheets

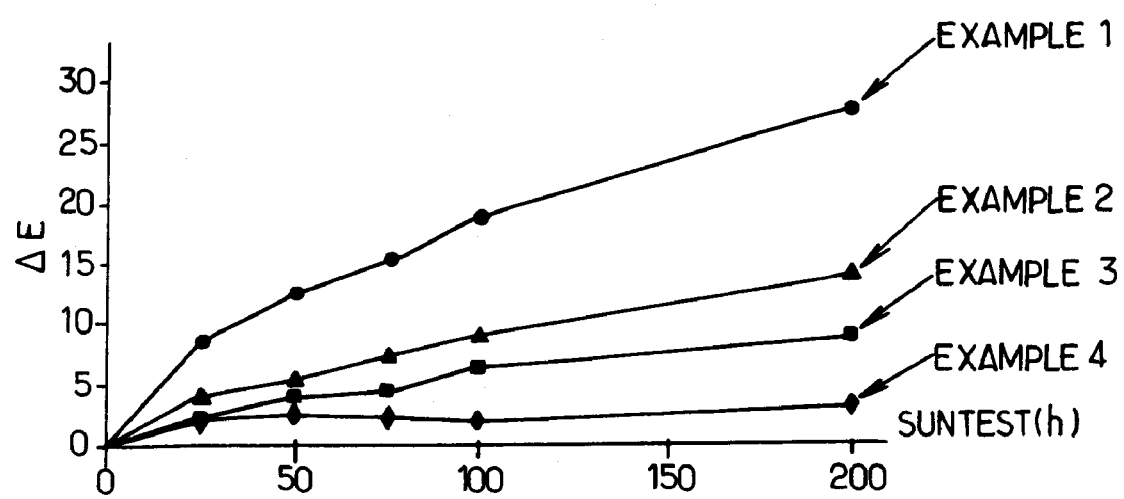

OPHTHALMIC LENSES COMPRISING A PHOTODEGRADATION PROTECTION COATING AND A PROCESS FOR PRODUCING SUCH LENSES

CROSS REFERENCE TO RELATED APPLICATIONS

Under 35 U.S.C. §119, this application claims the benefit of a foreign priority application filed in France, serial number 0511513, filed Nov. 14, 2005. Under 35 U.S.C. §119 (e) this application also claims priority to U.S. application 60/736,473 filed on Nov. 14, 2005.

BACKGROUND OF THE INVENTION

The present invention relates to an optical article, in particular an ophthalmic lens, which includes a photodegradation protection coating. More particularly, this coating protects the subjacent layer of material from photodegradation induced by ultraviolet radiation. This coating is particularly suitable for being deposited on an optical lens, and more specifically an ophthalmic lens that includes at least one subjacent coating comprising a substance sensitive to photodegradation.

The photodegradation protection coating used in the present invention is particularly suitable for protecting a subjacent layer comprising dyes, more particularly photodegradation-sensitive dichroic dyes. Advantageously, this anti-UV coating will itself be coated with a coating for protection against photooxidation by the oxygen in the air.

Such a combination thus protects a coating that contains sensitive dyes, both against photodegradation due to UV and against photooxidation due to oxygen, knowing that, from a radical standpoint, these two types of degradation may combine together to accelerate the degradation of the dyes and especially of the dichroic dyes. The photodegradation protection coating is particularly suitable for protecting dyes having chemical functional groups that are sensitive to ultraviolet, such as for example dichroic dyes or photochromic dyes.

The photodegradation of chemical species takes place only if there is absorption, by reactive parts of the chemical species, of radiation in the spectral range comprising far UV radiation, UV radiation and visible light.

Molecules excited by absorbing radiation energy can initiate chain reactions responsible for photoageing, namely intramolecular rearrangement, chain scission and photoisomerization. These reactions are chemical de-excitation reactions, but the molecules can also be physically de-excited by processes such as fluoroescence and photophorescence.

The most important de-excitation processes in the case of photoageing are those resulting in the formation of free radicals:

photolytic cleavage (a chemical process) cuts a molecular chain into two shorter, radical or non-radical, chains; and photosensitization (a physical process) results from energy transfer. An absorbent molecule D can be de-excited by transferring energy to another molecule A that is not absorbent. This principle may be expressed schematically in the following manner:

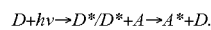

$D + h\nu \rightarrow D^*/D^* + A \rightarrow A^* + D.$

The "accepter" molecule A, excited in turn as (A*), may possibly be de-excited according to various processes, including photolytic cleavage.

Under irradiation, various elementary reactions (chemical processes), which may or may not be destructive, may take place, resulting inter alia in radical species capable of reacting with the oxygen in the air to provide further, unstable species and by-products of radical reactions.

Such degradation reactions have in particular been observed in materials that contain dyes, such as dichroic or photochromic dyes. These families of chemicals generally contain aromatic units, including certain entities that may be sensitive to UV radiation at least in certain specific wavelengths. As we have seen above, these photodegradation phenomena may combine with photooxidation phenomena caused by the oxygen in the air. These phenomena are complex as they involve many reactive species. They therefore cannot be easily characterized and identified. Consequently, one of the best solutions for limiting these phenomena is to protect the products containing such UV-sensitive and/or oxygen-sensitive entities by coating them with at least one photodegradation protection layer (an anti-UV coating) and optionally with an additional photooxidation protection layer (an oxygen barrier layer).

Dichroic dyes are particularly used in combination with liquid crystals, especially in coatings having a polarizing function. Such a combination occurs in particular in what are called LCP (liquid crystalline polymer) coatings. These coatings, combined with an LPP (linear photopolymer) coating, make it possible in particular to give the substrate containing them a polarizing function. Such coatings are used especially in display panels, but may also be used in optical articles (U.S. Pat. No. 5,602,661, US 2005/0151926, and EP 1 593 990). Thus, the use of such a coating on an optical substrate, such as an ophthalmic lens, gives the said lens particularly effective polarizing properties. It is thus possible to obtain ophthalmic lenses having a relative transmission factor in the visible range ($T_y$) of between 80% and 6%, combined with a contrast ratio that is higher than that generally observed for polarizing lenses obtained by bonding or laminating a polarizing film, and which commonly reaches values greater than 100. The use of coatings of the LPP type end of the LCP type that are deposited by spin coating on an organic substrate thus make it possible to obtain ophthalmic lenses having a high polarizability. In addition, the use of a spin-coating process for introducing the polarizing function is particularly advantageous in the field of ophthalmic lenses as this process may be fully integrated into production lines.

In the present application, the definitions of certain terms must be understood as follows:

"optical article" is understood to mean lenses for instruments and sight lenses, visors, and ophthalmic lenses;

"ophthalmic lens" is understood to mean lenses intended in particular to be fitted into a spectacle frame, having the function of protecting the eyes and/or of correcting sight, these lenses being chosen from afocal, unifocal, bifocal, trifocal and varifocal lenses;

"substrate" is understood to mean the transparent base material of the optical lens and more particularly of the ophthalmic lens. This material serves as a support for a multilayer consisting of one or more coatings, including in particular polarizing coatings; and "coating" is understood to mean any layer, film or varnish that may be in contact with the substrate, and/or with another coating deposited thereon, and that may in particular be chosen from tinted, anti-reflection, anti-fouling, impact-resistant, scratch-resistant, polarizing and antistatic coatings.

The effectiveness of the bilayer polarizer described above, comprising an LPP coating and an LCP coating, is dependent on the absorption spectra of the dichroic dye or dyes, on the dichroic ratio of the said dyes and on the order parameter, that is to say the average alignment of the liquid-crystal molecules (and therefore of the dichroic dyes) along one particular direction, imposed by the structuring of the LPP layer. The structuring of the LPP layer takes place during the step of polymerizing the latter under linearly polarized light. Ageing tests carried out on such polarizers under a UV (Suntest) lamp have demonstrated that the optical properties of ophthalmic lenses containing this bilayer system undergo substantial degradation. This is manifested especially by a reduction in polarizing performance, in particular by a drop in the contrast ratio (CR), by an increase in transmission (Tv %) and by a change in tint. This performance degradation is due mainly to the UV sensitivity of dichroic dyes which, as mentioned above, undergo photodegradation and photooxidation due to ultraviolet, to oxygen and to a combined action of ultraviolet and oxygen.

Such UV sensitivity is unacceptable for a polarizing ophthalmic lens that has to be particularly useful under strong sunlight conditions. One solution to this technical problem is therefore to provide a protective coating compatible with the optical properties of an ophthalmic lens. The said coating must thus be transparent, that is to say it must not scatter or diffract visible light, it must adhere durably and permanently to the coating that it has to protect, and it must be compatible with the other functional layers conventionally used in the field of ophthalmics, such as an abrasion-resistant layer.

Many systems giving a coating anti-UV properties are known. None of these systems fulfils all the abovementioned conditions. In the present case, the technical problem is admittedly how to obtain a photodegradation protection (anti-UV) coating, but this anti-UV coating must be able to adhere to the subjacent polarizing bilayer system while still maintaining optical and cosmetic properties acceptable for its application, that is to say as an ophthalmic lens.

BRIEF DESCRIPTION OF THE DRAWINGS

FIGS. 1, 2 and 3 show the graphical curves obtained from the values given in Tables 1, 2, 3 and 4.

FIG. 1 shows the variation in Tv(%),

FIG. 2 shows the variation in contrast ratio (CR) and

FIG. 3 shows the variation in tint (ΔE).

Figure 1:
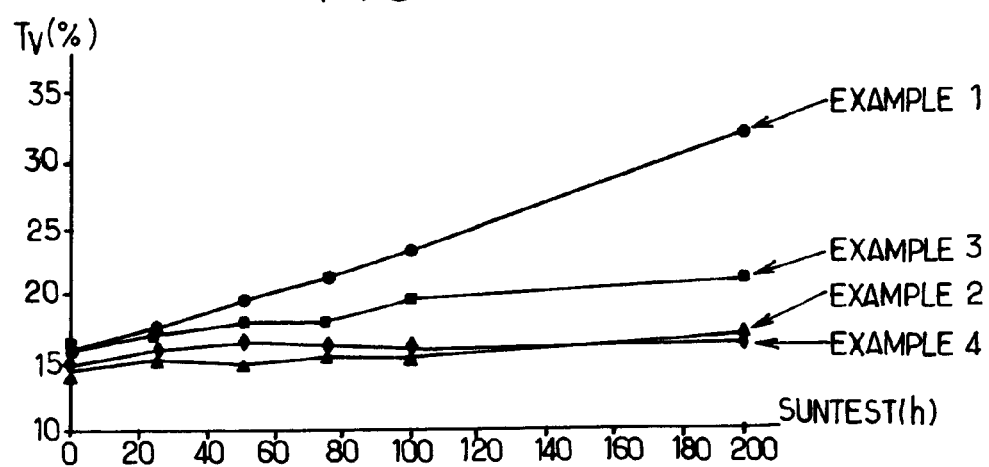
Figure 2:
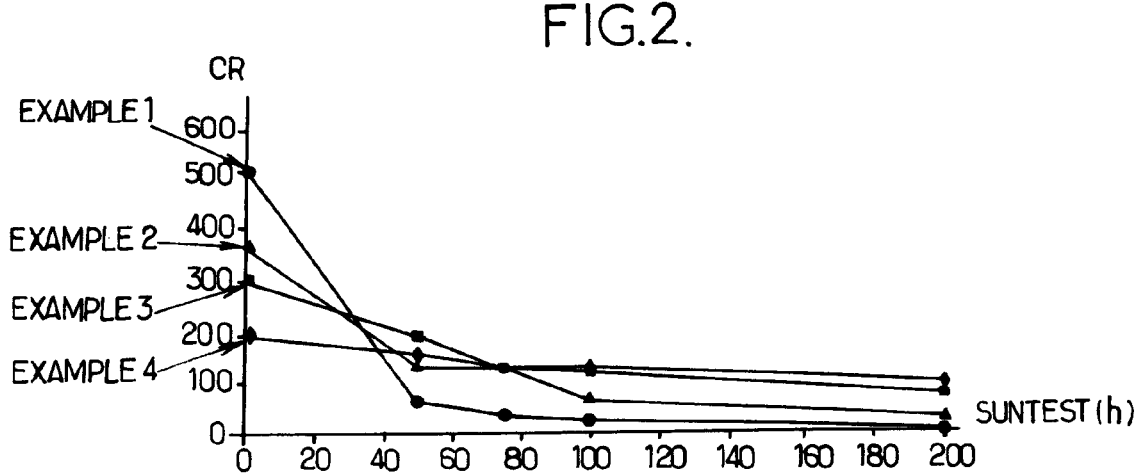

The Applicant has found, surprisingly, that it is possible to obtain a photodegradation protection coating that fulfils all of the abovementioned conditions, by synthesizing this coating by the photoinitiated polymerization of a blend of acrylic oligomers and acrylic monomers.

One subject-matter of the present invention is consequently an optical article, especially an ophthalmic lens, which comprises:

a substrate;

a coating containing at least one photodegradation-sensitive dye; and a photodegradation protection (anti-UV) coating for protecting the coating containing at least one photodegradation-sensitive dye, the photodegradation protection coating resulting from the photopolymerization of a mixture comprising:

(i) a blend of monofunctional or multifunctional acrylate monomers and acrylate oligomers;

(ii) from 5 wt % to 30 wt %, relative to the sum of (i), (ii) and (iii), of at least one UV absorber; and (iii) from 3 wt % to 12 wt %, relative to the sum of (i), (ii) and (iii), of at least one photoinitiator.

Optionally, the said coating may include additives such as surfactants or compounds for preventing the inhibition of oxygen, such as for example a blend of an acrylic amine and benzophenone.

The acrylate oligomer is preferably selected from the group consisting of aliphatic epoxy acrylate oligomers, aromatic epoxy acrylate oligomers, aliphatic urethane acrylate oligomers, aromatic urethane acrylate oligomers and polyester acrylate oligomers. The number-average molecular weight ($M_n$) of this oligomer is preferably between 500 g/mol and 10 000 g/mol.

Among the above acrylate oligomers, a difunctional aliphatic urethane acrylate oligomer of number-average molecular weight ($M_n$) of about 2200 g/mol is particularly preferred. Particularly advantageously, the oligomer used in the context of the invention is the difunctional aliphatic urethane acrylate oligomer sold under the name CN981 by Cray Valley. This acrylic urethane oligomer is particularly suitable for being used in optical lenses. This is because it has a low glass transition temperature ($T_g$), thus giving the coating containing it impact resistance properties. In addition, the urethane functional groups, thanks to their polarity, give the coating adhesion properties that are particularly advantageous if the ophthalmic lens includes additional layers.

The acrylate monomers may be monofunctional or multifunctional. Advantageously, they have a viscosity lower than that of the oligomer, thus making it easier to deposit the coating on a substrate, especially if the deposition process is a spin coating process.

These compounds make it possible to vary the mechanical and physicochemical properties of the coating. Thus, a person skilled in the art knows that a trifunctional or tetrafunctional monomer of low molecular weight results in a system having a high crosslinking density, resulting in good abrasion resistance, good chemical resistance and good temperature resistance. However, it is also known that such systems containing trifunctional or tetrafunctional monomers result in a high shrinkage during polymerization and consequently they lead to poor adhesion to the subjacent coating or substrate on which this coating is deposited. The shrinkage generates strains at the interfaces, which may lead to the coating separating by delamination.

The monofunctional monomers that can be used in the present invention are advantageously selected from the group consisting of isobornyl acrylate (IBOA), tetrahydrofurfuryl acrylate (THFA), lauryl acrylate and 2-phenoxyethyl acrylate (PEA). The difunctional monomers that can be used within the context of the invention are, for example, 1,6-hexanediol diacrylate (HDDA), tricyclodecanedi-methanol diacrylate (TCDDMDA), diethylene glycol diacrylate (DEGDA), polyethylene glycol diacrylates, tetraethylene glycol diacrylate, triethylene glycol diacrylate, tripropylene glycol diacrylate, polyethylene glycol diacrylate, ethoxylated bisphenol-A diacrylate, dipropylene glycol diacrylate, alkoxylated hexanediol diacrylate, esterdiol diacrylate, polypropylene glycol diacrylate and propoxylated neopentyl glycol diacrylate.

Within the context of the present invention, it is envisaged in particular to use, in the composition for preparing the photodegradation protection coating, a blend of at least two monofunctional and/or difunctional monomers as defined above.

In a first advantageous variant of the invention, the photodegradation protection coating comprises a blend of an acrylate oligomer and a monofunctional acrylate monomer. Preferably, the said coating comprises a blend of CN981 (Cray Valley) and isobornyl acrylate (IBOA).

In a second variant of the invention, the coating comprises a blend of an acrylate oligomer and at least one multifunctional acrylate monomer. Contrary to all expectations, the addition of a multifunctional acrylate monomer has made it possible to maintain good adhesion to the substrate. This combination also improves the chemical and mechanical resistance of the finished protective coating. Within the context of the invention, the multifunctional acrylate monomer or monomers are advantageously chosen from ethoxylated trimethylolpropane triacrylate (EOTMPTA), pentaerythritol tetraacrylate (PETTA), trimethylol-propane triacrylate (TMPTA), ditrimethylolpropane tetraacrylate (DiTMPTTA), tris(2-hydroxyethyl)-isocyanurate triacrylate (THEICTA), dipentaerythritol pentaacrylate (DiPEPA), pentaerythritol triacrylate, 3-propoxylated trimethylolpropane triacrylate (POTMPTA), 4-ethyoxylated pentaerythritol tetraacrylate (PPTTA), 5-ethoxylated pentaerythritol triacrylate, 5-ethoxylated pentaerythritol tetraacrylate and propoxylated glycerol triacrylate (PGTA).

Preferably, the multifunctional acrylate monomer is selected from the group consisting of pentaerythritol triacrylate, tris(2-hydroxyethyl)isocyanurate triacrylate (THEICTA), tricyclodecanedimethanol diacrylate (TCDDMDA), and dipentaerythritol pentaacrylate (DiPEPA). These monomers are for example sold by Cray Valley under the respective references SR444D, SR368, SR833S and SR399.

The acrylate monomer(s)/urethane acrylate oligomer weight ratio is between 0.5 and 6, preferably between 2 and 5.

According to a second advantageous variant of the invention, the anti-UV coating comprises a difunctional aliphatic urethane acrylate oligomer having a number-average molecular weight ($M_n$) of 2200 g/mol and a multifunctional acrylate monomer chosen from SR444D, SR368, SR833S and SR399, the multifunctional monomer/oligomer weight ratio being between 0.2 and 5.

In a third variant of the invention, the coating comprises a blend of an acrylic oligomer, one or more monofunctional acrylate monomers and one or more multifunctional acrylate monomers, the acrylate monomer(s)/oligomer weight ratio being between 0.2 and 6 and the proportion of monofunctional monomer(s) to multifunctional monomer(s) is greater than 50%.

The UV absorbers most commonly used are chosen from benzotriazoles, in particular hydroxyphenylbenzotriazole, hydroxyphenyl-S-triazine, hydroxylbenzophenones, and oxalic anilides. The UV absorber is preferably chosen from absorbers of the family of hydroxybenzophenones and benzotriazoles. These absorbers are distinguished in particular by good compatibility with the matrix containing them, i.e. the matrix obtained by blending the oligomer with the acrylate monomer, and, moreover, they are particularly suitable for absorbing UV at the wavelengths that cause most photodegradation of UV-sensitive dyes within the range of interest within the context of the invention. The UV absorbers preferably chosen are CYASORB® UV24 and UV5411 sold by Cytec. These are 2,2'-dihydroxy-4-methoxybenzophenone and 2-{[5-(2,2-diethyl)butyl]-(2-hydroxy)phenyl}-benzotriazole, respectively.

The amount of UV absorber and the thickness of the photodegradation protection coating are adjusted in the formulation so as to obtain a UV cut-off (the wavelength for which the transmittance (T %) is less than 1%) at least equal to 360 nm, and preferably equal to 395 nm. The formulation thus contains from 5% to 30%, by weight, preferably from 10% to 20% by weight and in particular from 12% to 18% by weight of UV absorber.

The thickness of the coating is between 5 and 30 microns, preferably between 15 and 22 microns.

The choice of photoinitiator is guided by its absorption spectrum, which must be set on the emission spectrum of the UV lamps and set of the absorption spectrum of the UV absorber.

Irgacure 819—a bisacylphosphine oxide (BAPO) sold by Ciba-Geigy—was selected. It exhibits absorption peaks up to 405 nm. The formulation contains from 3% to 12%, preferably 5% to 8% and very preferably around 6% by weight of photoinitiator. Other photoinitiators can be used and examples that may be mentioned include in particular: Darocur TPO (monoacylphosphine oxide (MAPO)), Darocur 4265 (a 50%/50% MAPO/α-hydroxyketone blend), Irgacure 2022 (a 20%/80% BAPO/α-hydroxyketone blend), and Irgacure 784 (bis(eta5-2,4-cyclopentadien-1-yl)bis[2,6-difluoro-3-(1H-pyrrol-1-yl)phenyl] titanium). A blend of at least two photoinitiators may also be used.

The substrate of the optical article, in particular of the ophthalmic lens, may be of the mineral or organic type. By way of non-limiting indication, it may be mentioned that the substrates conventionally used in optics and in ophthalmy may be used within the context of the invention as organic substrate. For example, substrates of the following types are suitable: polycarbonates; polyamides; polyimides; polysulphones; polyethylene terephthalate/polycarbonate copolymers; polyolefins, especially polynorbornenes; diethylene glycol bis(allylcarbonate) polymers and copolymers; (meth) acrylic polymers and copolymers, especially (meth)acrylic polymers and copolymers derived from bisphenol A; thio (meth)acrylic polymers and copolymers; urethane and thiourethane polymers and copolymers; epoxy polymers and copolymers; and episulphide polymers and copolymers.

In a preferred embodiment of the invention, the optical article is an ophthalmic lens comprising:
   a substrate;
   a coating containing at least one photodegradation-sensitive dye;
   a photodegradation protection coating; and optionally
   an oxygen barrier layer chosen from a dense metal oxide layer, a non-dense metal oxide layer and a system comprising a multilayer consisting of 1 to 4 layers of different metal oxides.

In another preferred embodiment of the invention, the optical article is a polarized ophthalmic lens, comprising:
   a substrate;
   a bilayer polarizing coating containing a linear photopolymer (LPP) first layer and a liquid-crystal polymer (LCP) second layer containing at least one photodegradation-sensitive dichroic dye;
   a photodegradation protection coating;
   a bilayer abrasion-resistant coating; and
   an oxygen barrier layer.

Tests were carried out in particular on such a polarizing ophthalmic lens having a polarizing LPP/LCP bilayer coating comprising at least one dichroic dye, and a photodegradation protection coating. The LPP/LCP bilayer coating was deposited using the protocol described in EP 1 593 990. The results are excellent. However, depending on the exposure time and the nature of the dichroic dyes contained in the LCP layer, side reactions due to the oxygen in the air may still occur. To prevent this photooxidation, the use of an oxygen barrier layer has been envisaged. Such coatings are known to those skilled in the art. For indication, Patent JP 06-192651 may be mentioned, which describes the use of thin layers comprising metal oxide particles and metal particles as protective layer, for protecting an underlying layer containing photochromic dyes from water and gases.

An oxygen barrier layer comprises either a dense metal oxide layer or a non-dense metal oxide layer, or a system comprising a multilayer consisting of 1 to 4 layers of different metal oxides.

The oxygen barrier layer may consist of a monolayer or multilayer film of materials such as SiO, $SiO_2$, $Si_3N_4$, $TiO_2$, $ZrO_2$, $Al_2O_3$, $MgF_2$ or $Ta_2O_5$, or mixtures thereof. Advantageously, the monolayer system comprises silicon dioxide and has a thickness of between 10 and 100 nm. The multilayer advantageously comprises an alternation of at least two monolayers of different oxides, these oxides advantageously being chosen from silicon oxide, titanium oxide and zirconium oxide. Advantageously, the multilayer has a thickness of between 50 nm and 300 nm, preferably between 100 and 200 nm.

Within the context of the invention, it is also possible to combine the photodegradation protection coating with a mirror-type coating, the latter also having an oxygen barrier function. The oxygen barrier layer may be deposited either directly on the photodegradation protection (anti-UV) coating, as described above, or on an impact-resistant primer coating and/or an abrasion-resistant primer.

This oxygen barrier coating is applied by methods well known to those skilled in the art, and generally by vacuum deposition using one of the following techniques:

evaporation, optionally ion-beam-assisted evaporation;
ion beam sputtering;
cathode sputtering;
plasma-enhanced chemical vapour deposition.

A further subject-matter of the present invention is a process for manufacturing an optical article as described above, in particular a tinted and/or polarized ophthalmic lens, comprising the following steps:

deposition of a coating containing at least one photodegradation-sensitive dye on a bare substrate or on a substrate coated with at least one layer of varnish;
optionally, surface treatment of the resulting coated substrate, preferably chemical surface treatment;
deposition of the photodegradation protection coating by spin coating; and
photopolymerization of the said photodegradation protection coating.

Within the context of this process, the bare substrate or the substrate coated with at least one layer of varnish may optionally, and prior to deposition of the coating that includes at least one photodegradation-sensitive dye, undergo a surface treatment. Among the surface treatments conventionally used within the context of the processes for producing ophthalmic lenses, mention may be made by way of non-limiting example of chemical, thermal, plasma and/or corona treatments.

The photodegradation protection coating may be coated either directly with an abrasion-resistant layer or with a primer layer, improving the impact strength of the article, on which layer an abrasion-resistant layer is then deposited, the primer layer also improving the anchoring of this abrasion-resistant layer. It may also be envisaged to deposit, on the abrasion-resistant layer, an antireflection coating and, finally, this antireflection coating may be coated with a hydrophobic and oleophobic anti-soiling coating. An antistatic coating may also be present.

The primer layer, when it is present, may be any primer layer conventionally used in the optical field and in particular in the ophthalmic field.

Typically, these primers, in particular impact-resistant primers, are coatings based on (meth)acrylic polymers polyurethanes or polyesters, or else based on epoxy(meth)acrylate copolymers.

The abrasion-resistant coating may be any abrasion-resistant coating conventionally used in the field of optics and in particular in the field of ophthalmic optics.

By definition, an abrasion-resistant coating is a coating that improves the abrasion resistance of the finished optical article compared with the same article not having the abrasion-resistant coating.

Preferred abrasion-resistant coatings are those obtained by curing a composition that includes one or more epoxyalkoxysilanes or a hydrolyzate thereof, silica and a cure catalyst. Examples of such compositions are described in International Application WO 94/10230 and U.S. Pat. No. 4,211,823, U.S. Pat. No. 5,015,523, and European Patent EP 614 957.

A further subject-matter of the invention is another process for manufacturing an optical article as described above, in particular a polarized ophthalmic lens, comprising the following steps:

deposition, on a substrate, preferably an organic substrate, of a bilayer polarizing coating comprising a linear photopolymer (LPP) first layer in direct contact with the surface of the substrate and a liquid-crystal polymer (LCP) second layer containing at least one photodegradation-sensitive dichroic dye, preferably a mixture of dichroic dyes, in direct contact with the said first layer;
surface treatment of the substrate, comprising the bilayer polarizing coating obtained, by dipping it in succession into a 5% sodium hydroxide bath, into a water bath and into an isopropanol bath;
deposition of a photodegradation protection coating by spin coating; and
photopolymerization of the said photo-degradation protection coating.

The bilayer polarizing coating is advantageously produced under the operating conditions described in Patent Application EP 1 593 990.

Particularly advantageously, the above process further includes an additional step consisting in depositing, on the photodegradation protection coating, a bilayer abrasion-resistant coating comprising:

a first layer, in direct contact with the surface of the photodegradation protection coating, comprising an aqueous polyurethane dispersion; and
an abrasion-resistant second layer comprising aluminium and silane hydrolyzates.

Ophthalmic lenses comprising such superposed layers have been submitted to scratch resistance tests. It has been surprisingly found that lenses comprising an anti-UV coating are more scratch resistant than lenses comprising only an anti-abrasion coating as described above. The anti-UV coating having a low glass transition temperature (Tg of about 20° C.) was expected, on the contrary, to present a lower scratch resistance. Thus the anti-UV coating of the present invention not only confers protection against photodegradation and photooxidation, but also contributes to better scratch resistance of the ophthalmic lens comprising this coating, eventually leading to a better abrasion resistance of the optical article comprising such stacked layers.

In a particularly preferred variant, the process for manufacturing an optical article and in particular a polarized ophthalmic lens as described above, also includes a step consisting in depositing, on the photodegradation protection coating or on the bilayer abrasion-resistant coating, an oxygen barrier layer chosen from a dense metal oxide layer, a non-dense metal oxide layer and a system comprising a multilayer consisting of 1 to 4 layers of different metal oxides.

The following examples illustrate how the invention is realized, but in no case do they limit the scope of the invention.

EXAMPLE

Preparation of a Polarizing Ophthalmic Lens Having a Photodegradation Protection Coating The polarizing coating was applied to a high-index lens, the substrate of which was a polythiourethane. The preferred polythiol was 1,2-bis(2'-mercaptoethyl thio)-3-mercaptopropane (MDO). The preferred isocyanate was m-xylene diisocyanate.

1. Preparation of the Polarizing Bilayer Coating:

The operating method was as described in patent Application EP 1 593 990.

a. Preparation of the LPP Layer and Deposition:

The lens was washed in a 5% sodium hydroxide solution in an ultrasonic bath at 55° C. It was then dipped into water and then into deionized water (optionally into isopropanol). A 2 wt % solution comprising an acrylic polymer having cinnamic acid functional groups was prepared in a 10/1 methyl ethyl ketone-cyclopentanone mixture. This solution was deposited by spin coating on to the substrate of the lens. The rotation speed was 500 rpm for 3 seconds, and then 2500 rpm for 20 seconds. The solvent was evaporated by heating in an oven at 100° C. for 20 minutes. This layer was irradiated under a UV polarizer with a dose of 100 mJ/cm$^2$.

b. Preparation of the LCP Layer and Deposition:

A solution containing liquid-crystal molecules and dichroic dyes sensitive to degradation by ultraviolet and oxygen was prepared in cyclohexanone. The solid part contained in this solution was typically 40% by weight. The amount of dichroic dye was about 10% by weight. This solution was deposited by spin coating on to the LPP layer (rotation speed=500 rpm for 25 seconds). The LCP layer was dried for 10 minutes at a temperature of 87° C. After evaporation of the solvents, this layer was crosslinked in a nitrogen atmosphere by irradiation with a dose of 30 J/cm$^2$ from a UV source.

2. Preparation of the Photodegradation Protection Coating

The oligomer used was urethane acrylic sold under the name CN981 by Cray Valley. The monofunctional monomer was isobornyl acrylate (IBOA) sold under the reference SR506D by Cray Valley.

a. Preparation of the Formulation:

To reduce the viscosity of the oligomer, it was heated in an oven at 60° C. for 1 hour;

12 g of CN981, 48 g of SR506D, 4.8 g of Irgacure 819 (photoinitiator) and 12 g of Cyasorb UV-24 (UV absorber) were introduced into a glass flask. The percentages by weight of the compounds were: 15.7% CN981; 62.5% SR506D; 6.2% Irgacure 819; and 15.6% Cyasorb UV-24;

to homogenize the solution and completely dissolve the UV absorber, the solution was left with stirring for 12 hours at room temperature.

b. Deposition Process

Surface preparation: The lens having the bilayer polarizing coating underwent a surface treatment: the lens was dipped into a first bath containing 5% sodium hydroxide, the temperature of which was 50° C. It was then rinsed in a bath of softened water. A final bath, of isopropanol, made drying of the glass easier.

Deposition of the formulation: The composition for the photodegradation protection coating was deposited by spin coating, with a speed of 1000 rpm for 20 seconds, so as to obtain a final thickness of 20 microns.

Polymerization of the Coating: A continuous oven sold by Fusion UV Systems (reference: LH6 (Light Hammer 6)) was used. It was provided with a "V" lamp from Fusion UV Systems. The run speed of the belt was 8.2 m/min. The lens passed beneath the "V" lamp four times. The total radiation dose received by the coating in order to polymerize it was 2.5 J/cm$^2$.

The UV cut-off of the coating thus deposited was 396 nm (the UV cut-off is defined as the wavelength at which the transmission becomes less than 1%).

3. Preparation of the Abrasion-Resistant Bilayer Coating:

The abrasion-resistant bilayer coating was obtained according to the following steps:

firstly, a latex primer layer was obtained according to the protocol described in Example 1 of U.S. Pat. No. 5,316,791 using, as substrate, an aqueous polyurethane dispersion sold by Baxenden under the reference W-240. This first layer was deposited by dip-coating it onto the lens bearing the polarizing coating described in step 1 and the photodegradation protection coating as described in step 2, and was heated at 87° C. for 4 minutes. The thickness of this layer was 1 µm;

a second layer was deposited on this first layer according to the protocol described in Example 3 of Patent EP 0 614 957. This second layer comprised, relative to the total weight of the composition, 22% glycidoxypropylmethyldimethoxysilane, 62% colloidal silica, representing 30% of the solid part in methanol, and 0.70% aluminium acetylacetonate (a catalyst), the difference from 100% by weight consisting mainly of water. This second layer was deposited by dipping the lens into the solution, and then polymerized for 3 hours at 100° C. The thickness of this layer was 3.5 µm.

4. Preparation of the Oxygen Barrier Coating:

The oxygen barrier layer was a multilayer system consisting of four layers, comprising an alternation of $ZrO_2$ and $SiO_2$ layers. The total thickness of the multilayer was 200 nm (nanometers).

The various layers were produced in a Balzers BAK machine, in rotation in a high vacuum.

5. UV-Aging Test: Suntest

The following configurations were compared in the Suntest:

Example 1

Lens having a bilayer polarizing coating (polarized coating)+abrasion-resistant bilayer coating;

Example 2 polarized coating+photodegradation protection coating+abrasion-resistant coating;

Example 3 polarized coating+abrasion-resistant coating+$O_2$ barrier coating; and

Example 4 polarized coating+photodegradation protection coating+abrasion-resistant coating+$O_2$ barrier coating.

The UV resistance of the polarized coatings comprising an LPP/LCP bilayer system was determined after exposure of the lenses in the Suntest machine.

The principle of this test is described below:

The lenses were placed in the Suntest equipment, which produced an illumination of 60 klux. They were subjected to successive solar ageing cycles of 50 hours. The total exposure time varied from 50 to 200 hours. After each illumination cycle, one or more optical properties of the product were measured in order to determine any change. These were mainly the visual transmission ($T_v$), the contrast ratio (CR) and the tint (L*,a*,b*).

Example 1 shows the behaviour of a polarized lens with no UV protection. Table 1 shows that, after 50 h in the Suntest machine, there is a substantial reduction in the polarization effectiveness, measured by the contrast ratio (CR), and also a change in coloration (ΔE) and an increase in transmission (Tv %) of the lenses. In each of the following tables, CR is the contrast ratio and ΔE is the colorimetric change: $\Delta E=(\Delta L^2+\Delta a^2+\Delta b^2)^{1/2}$.

TABLE 1

|       | Tv (%) | ΔTv/Tv | ΔE   | CR  |
|-------|--------|--------|------|-----|
| 0 h   | 15.88  | 0      | 0    | 512 |
| 25 h  | 17.29  | 8.9    | 8.5  | /   |
| 50 h  | 19.38  | 22.04  | 12.5 | 59  |
| 75 h  | 21.10  | 32.9   | 15.1 | 30  |
| 100 h | 23.16  | 45.8   | 18.8 | 19  |
| 200 h | 32.23  | 103.0  | 27.8 | 6   |

Example 2 illustrates the behaviour of a polarizing ophthalmic lens having a photodegradation protection coating as described above. Table 2 shows the Suntest results.

TABLE 2

|       | Tv (%) | ΔTv/Tv | ΔE   | CR  |
|-------|--------|--------|------|-----|
| 0 h   | 14.37  | 0      | 0    | 367 |
| 25 h  | 15.07  | 4.9    | 3.8  | /   |
| 50 h  | 14.65  | 1.9    | 5.5  | 131 |
| 75 h  | 15.32  | 6.6    | 7.3  | 127 |
| 100 h | 15.22  | 5.9    | 8.9  | 64  |
| 200 h | 16.98  | 18.2   | 14.0 | 27  |

Example 3 illustrates the behaviour of a polarizing ophthalmic lens having an oxygen barrier layer as described above. Table 3 gives the Suntest results.

TABLE 3

|       | Tv (%) | ΔTv/Tv | ΔE  | CR  |
|-------|--------|--------|-----|-----|
| 0 h   | 16.01  | 0      | 0   | 298 |
| 25 h  | 16.91  | 5.6    | 2.0 | /   |
| 50 h  | 17.81  | 11.2   | 3.7 | 188 |
| 75 h  | 17.78  | 11.0   | 4.0 | 127 |
| 100 h | 19.50  | 21.8   | 6.2 | 121 |
| 200 h | 21.09  | 31.7   | 8.7 | 75  |

Example 4 describes the behaviour of a polarizing ophthalmic lens having a photodegradation protection coating and an oxygen barrier layer such as those described above. Table 4 gives the Suntest results.

TABLE 4

|       | Tv (%) | ΔTv/Tv | ΔE  | CR  |
|-------|--------|--------|-----|-----|
| 0 h   | 14.65  | 0      | 0   | 188 |
| 25 h  | 15.78  | 7.7    | 1.8 | /   |
| 50 h  | 16.18  | 10.4   | 2.3 | 157 |
| 75 h  | 15.93  | 8.7    | 2.0 | 127 |
| 100 h | 15.68  | 7.0    | 1.7 | 130 |
| 200 h | 16.39  | 11.9   | 3.0 | 97  |

6. Scratch Resistance Test

Description of the test using steel wool: extra fine steel wool (STARWAX n° 000) was used; a coated lens was rubbed 10 times (back and forth) under constant pressure with a folded piece of steel wool of 3×3 cm in the direction of the fibres thereof. The lens was then wiped with a dry rag and rinsed with alcohol. The lenses surface condition was then visually evaluated and a score was assigned according to the following graduation: 0=no scratch at all; 1=very few scratches (0 to 5 scratches), 2=few scratches (about 20 scratches), 3=quite a lot scratches (about 50 scratches), 4=strongly scratched glass (more than 50 scratches), 5=bare substrate The results are presented in Table 5

Batch n° 1: Ophthalmic lens comprising a polarizing bilayer coating+anti-UV coating according to the invention Batch n° 2: Ophthalmic lens comprising a polarizing bilayer coating+anti-abrasion coating such as described above

TABLE 5

|       | Batch n° 1 | Batch n° 2 |
|-------|------------|------------|
| score | 1          | 2          |

Example B

Preparation of a Tinted Ophthalmic Lens with a Photodegradation Protection Coating An ophthalmic lens Orma® is tinted by dipping it into an aqueous solution comprising a dye (BPI Molecular catalytic black, from BPI). A tinted ophthalmic lens having a Tv of about 17% is obtained after 10 minutes of immersion (dipcoating) of the lens in the solution maintained at a temperature of about 91° C. to 94° C.

The resultant ophthalmic lens is protected against photodegradation by deposition of an anti-UV coating according to the invention (see step 2)

Table 6 shows the "Suntest" results for a standard tinted ophthalmic lens without anti-UV coating.

TABLE 6

|       | Tv (%) | ΔTv/Tv | ΔE  |
|-------|--------|--------|-----|
| 0 h   | 16.67  | 0      | 0.0 |
| 50 h  | 17.66  | 6      | 1.8 |
| 100 h | 18.65  | 12     | 3.7 |
| 150 h | 19.91  | 19     | 5.7 |
| 200 h | 21.23  | 27     | 7.7 |

Table 7 shows the "Suntest" results for a tinted ophthalmic lens according to the invention comprising an anti-UV coating.

TABLEAU 7

|       | Tv (%) | ΔTv/Tv | ΔE  |
|-------|--------|--------|-----|
| 0 h   | 17.54  | 0      | 0.0 |
| 50 h  | 17.76  | 1      | 0.3 |
| 100 h | 17.96  | 2      | 0.9 |
| 150 h | 18.40  | 5      | 1.5 |
| 200 h | 18.87  | 8      | 2.3 |

The invention claimed is:

1. An ophthalmic lens comprising:
    a lens substrate;
    a coating containing at least one photodegradation-sensitive dye; and
    a photodegradation protection coating for protecting the coating containing at least one photodegradation-sensitive dye from UV radiation,
the photodegradation protection coating resulting from the photopolymerization of a mixture comprising (i), (ii), and (iii):
    (i) a blend of acrylate monomers and acrylate oligomers;
    (ii) from 5 wt % to 30 wt %, relative to the sum of (i), (ii) and (iii), of at least one UV absorber; and
    (iii) from 3 wt % to 12 wt %, relative to the sum of (i), (ii) and (iii), of at least one photoinitiator.

2. The ophthalmic lens according to claim 1, wherein the acrylate oligomer is selected from the group consisting of aliphatic epoxy acrylate oligomers, aromatic epoxy acrylate oligomers, aliphatic urethane acrylate oligomers, aromatic urethane acrylate oligomers and polyester acrylate oligomers.

3. The ophthalmic lens according to claim 1, wherein the number-average molecular weight ($M_n$) of the acrylate oligomer is between 500 g/mol and 10 000 g/mol.

4. The ophthalmic lens according to claim 1, wherein the acrylate oligomer is a difunctional aliphatic urethane acrylate oligomer.

5. The ophthalmic lens according to claim 4, wherein the acrylate oligomer has a number-average molecular weight $M_n$ of 2200 g/mol.

6. The ophthalmic lens according to claim 1, wherein the acrylate monomer is a monofunctional monomer selected from the group consisting of isobornyl acrylate, tetrahydrofurfuryl acrylate, lauryl acrylate, and 2-phenoxyethyl acrylate, or a difunctional monomer selected from the group consisting of 1,6-hexanediol diacrylate, tricyclodecanedimethanol diacrylate, diethylene glycol diacrylate, polyethylene glycol diacrylates, tetraethylene glycol diacrylate, triethylene glycol diacrylate, tripropylene glycol diacrylate, polyethylene glycol diacrylate, ethoxylated bisphenol-A diacrylate, dipropylene glycol diacrylate, alkoxylated hexanediol diacrylate, esterdiol diacrylate, polypropylene glycol diacrylate, and propoxylated neopentyl glycol diacrylate.

7. The ophthalmic lens according to claim 1, wherein (i) is a blend of an acrylate oligomer and a monofunctional acrylate monomer.

8. The ophthalmic lens according to claim 7, wherein the acrylate monomer is isobornyl acrylate.

9. The ophthalmic lens according to claim 1, wherein the acrylate monomer is a multifunctional monomer selected from the group consisting of ethoxylated trimethylolpropane triacrylate, pentaerythritol tetraacrylate, trimethylol-propane triacrylate, ditrimethylolpropane tetraacrylate, tris(2-hydroxyethyl)-isocyanurate triacrylate, dipentaerythritol pentaacrylate, pentaerythritol triacrylate, 3-propoxylated trimethylolpropane triacrylate, 4-ethoxylated pentaerythritol tetraacrylate, 5-ethoxylated pentaerythritol triacrylate, 5-ethoxylated pentaerythritol tetraacrylate, and propoxylated glycerol triacrylate.

10. The ophthalmic lens according to claim 9, wherein the multifunctional acrylate monomer is selected from the group consisting of pentaerythritol triacrylate, tris(2-hydroxyethyl)-isocyanurate triacrylate, and dipentaerythritol pentaacrylate.

11. The ophthalmic lens according to claim 1, wherein (i) is a blend of an acrylate oligomer and at least two acrylate monomers, wherein the at least two acrylate monomers comprise monofunctional and/or difunctional acrylate monomers.

12. The ophthalmic lens according to claim 1, wherein the acrylate oligomer is a urethane acrylate oligomer and the acrylate monomer(s)/urethane acrylate oligomer weight ratio is between 0.5 and 6.

13. The ophthalmic lens according to claim 12, wherein the acrylate monomer(s)/urethane acrylate oligomer weight ratio is between 2 and 5.

14. The ophthalmic lens according to claim 1, wherein (i) is a blend of a difunctional aliphatic urethane acrylate oligomer and a multifunctional acrylate monomer selected from the group consisting of pentaerythritol triacrylate, tris(2-hydroxyethyl)isocyanurate triacrylate, tricycle-decanedimethanol diacrylate and dipentaerythritol pentaacrylate.

15. The ophthalmic lens according to claim 14, wherein the multifunctional acrylate monomer/aliphatic urethane acrylate oligomer weight ratio is between 0.2 and 5.

16. The ophthalmic lens according to claim 1, wherein (i) is a blend of an acrylate oligomer, one or more monofunctional acrylate monomers and one or more multifunctional acrylate monomers, the acrylate monomer(s)/oligomer weight ratio being between 0.2 and 6 and the proportion of monofunctional monomer(s) to multifunctional monomer(s) being greater than 50%.

17. The ophthalmic lens to claim 1, wherein the UV absorber is selected from the group consisting of benzotriazoles, hydroxyphenyl-S-triazine, hydroxybenzo-phenones, and oxalic anilides.

18. The ophthalmic lens according to claim 17, wherein the UV absorber is selected from the group consisting of hydroxybenzophenones and benzotriazoles.

19. The ophthalmic lens according to claim 18, wherein the UV absorber is selected from the group consisting of 2,2'-dihydroxy-4-methoxybenzophenone and 2-{[5-(2,2-diethyl)butyl]-(2-hydroxy)phenyl}-benzotriazole.

20. The ophthalmic lens according to claim 1, wherein the photodegradation protection coating contains from 10% to 20% by weight of UV absorber.

21. The ophthalmic lens according to claim 20, wherein the photodegradation protection coating contains from 12% to 18% by weight of UV absorber.

22. The ophthalmic lens according to claim 1, wherein the thickness of the photodegradation protection coating is adjusted so as to obtain a UV cut-off of at least 360 nm and preferably 395 nm.

23. The ophthalmic lens according to claim 22, wherein the thickness of the photodegradation protection coating is between 5 and 30 microns.

24. The ophthalmic lens according to claim 23, wherein the thickness of the photodegradation protection coating is between 15 and 22 microns.

25. The ophthalmic lens according to claim 1, wherein the photoinitiator is bisacylphosphine oxide.

26. The ophthalmic lens according to claim 1, wherein the photodegradation protection coating contains from 5% to 8% by weight of photoinitiator.

27. The ophthalmic lens according to claim 1, further comprising an oxygen barrier layer or an oxygen barrier multilayer system selected from the group consisting of a dense metal oxide layer, a non-dense metal oxide layer and a multilayer system comprising 1 to 4 layers of different metal oxides.

28. The ophthalmic lens according to claim 1, wherein said coating containing at least one photodegradation-sensitive dye is a bilayer polarizing coating containing a linear photopolymer (LPP) first layer and a liquid-crystal polymer (LCP) second layer containing at least one photodegradation-sensitive dichroic dye.

29. A process for manufacturing an ophthalmic lens comprising the following steps:
- providing a lens substrate that is optionally coated with at least one layer of varnish;
- depositing a coating containing at least one photodegradation-sensitive dye on the lens substrate, yielding a coated lens substrate;
- optionally, performing a surface treatment of the coated lens substrate;
- depositing a photo-polymerizable photodegradation protection coating composition on the optionally surface-treated coated lens substrate by spin coating; and
- photo-polymerizing the photo-polymerizable photodegradation protection coating composition;
- wherein the photo-polymerizable photodegradation protection coating composition is a mixture comprising (i), (ii), and (iii):
- (i) a blend of acrylate monomers and acrylate oligomers;
- (ii) from 5 wt % to 30 wt %, relative to the sum of (i), (ii) and (iii), of at least one UV absorber; and
- (iii) from 3 wt % to 12 wt %, relative to the sum of (i), (ii) and (iii), of at least one photoinitiator.

30. The process of claim 29, wherein:
- the step of depositing a coating containing at least one photodegradation-sensitive dye on the lens substrate comprises the deposition of a bilayer polarizing coating comprising a linear photopolymer (LPP) first layer in direct contact with the surface of the lens substrate and a liquid-crystal polymer (LCP) second layer containing at least one photodegradation-sensitive dichroic dye in direct contact with the LPP first layer; and
- the step of performing surface treatment of the coated lens substrate is performed by dipping the coated lens substrate in succession into a 5% sodium hydroxide bath, into a water bath and into an isopropanol bath.

31. The process according to claim 30, further comprising the step of depositing a bilayer abrasion-resistant coating onto the photo-polymerized photodegradation protection coating, wherein the bilayer abrasion-resistant coating comprises:
- a first layer comprising an aqueous polyurethane dispersion deposited directly on the surface of the photo-polymerized photodegradation protection coating; and
- an abrasion-resistant second layer comprising aluminium and silane hydrolyzates.

32. The process according to claim 30, further comprising the step of depositing an oxygen barrier layer onto the photo-polymerized photodegradation protection coating, wherein the oxygen barrier layer is selected from the group consisting of a dense metal oxide layer, a non-dense metal oxide layer and a system comprising a multilayer consisting of 1 to 4 layers of different metal oxides.

33. The process according to claim 31, further comprising the step of depositing an oxygen barrier layer onto the bilayer abrasion resistant coating, wherein the oxygen barrier layer is selected from the group consisting of a dense metal oxide layer, a non-dense metal oxide layer and a system comprising a multilayer consisting of 1 to 4 layers of different metal oxides.

* * * * *